US008819847B2

(12) United States Patent  
Barve et al.

(10) Patent No.: US 8,819,847 B2  
(45) Date of Patent: Aug. 26, 2014

(54) ASSOCIATING A UNIQUE IDENTIFIER AND A HIERARCHY CODE WITH A RECORD

(75) Inventors: Ajay Barve, Coppell, TX (US); Jimmy LaGrenade, Wylie, TX (US); Casey Harris, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 1058 days.

(21) Appl. No.: 12/175,831

(22) Filed: Jul. 18, 2008

(65) Prior Publication Data

US 2010/0017844 A1 Jan. 21, 2010

(51) Int. Cl.  
*G06F 7/04* (2006.01)

(52) U.S. Cl.  
USPC .................. 726/28; 726/26; 726/27; 726/29; 726/30

(58) Field of Classification Search  
USPC ...................................... 726/26–30  
See application file for complete search history.

(56) References Cited

U.S. PATENT DOCUMENTS

| 7,231,668 | B2* | 6/2007 | Jacobson | 726/26 |
| 7,886,359 | B2* | 2/2011 | Jones et al. | 726/26 |
| 2003/0037116 | A1 | 2/2003 | Nolan et al. | |
| 2003/0167402 | A1* | 9/2003 | Stolfo et al. | 713/200 |
| 2004/0015579 | A1* | 1/2004 | Cooper et al. | 709/223 |
| 2004/0153515 | A1* | 8/2004 | Touboul et al. | 709/206 |
| 2004/0177271 | A1 | 9/2004 | Arnold et al. | |
| 2004/0215610 | A1 | 10/2004 | Dixon et al. | |
| 2005/0027723 | A1 | 2/2005 | Jones et al. | |
| 2006/0123462 | A1* | 6/2006 | Lunt et al. | 726/1 |
| 2007/0180258 | A1* | 8/2007 | Broussard et al. | 713/182 |
| 2008/0320584 | A1* | 12/2008 | Hamilton et al. | 726/13 |
| 2009/0300113 | A1* | 12/2009 | Conmy et al. | 709/204 |
| 2009/0319797 | A1* | 12/2009 | Tornqvist | 713/176 |
| 2010/0329454 | A1* | 12/2010 | Takashima | 380/44 |

OTHER PUBLICATIONS

Krohn, Information Flow Control for Standard OS Abstractions, SOSP '07 Proceedings of twenty-first ACM SIGOPS symposium on Operating systems principles, pp. 325-239.*  
Landwehr et al., A Security Model for Military Message Systems: Retrospective,Computer Security Applications Conference, 2001. ACSAC 2001. Proceedings 17th Annual, pp. 174-190.*  
International Search Report and Written Opinion for GB0912344.9, mailed Oct. 14, 2009.  
U.K. Examination Report for Application No. GB0912344.9, mailed Mar. 6, 2012.

* cited by examiner

*Primary Examiner* — Luu Pham  
*Assistant Examiner* — Roderick Tolentino  
(74) *Attorney, Agent, or Firm* — Banner & Witcoff, Ltd.; Michael A. Springs

(57) ABSTRACT

A method and system for creating a record and associating a unique identifier and a hierarchy code with the record where the record is created in response to identifying that a transmission violates an institution's policy. The record may also be passed to a reporting module which may generate a report based on the unique identifier and/or a hierarchy code. Additionally, the record may be passed to a remediation agent for handling. The remediation agent may also update the record based on actions taken by the remediation agent or updates identified by the remediation agent.

20 Claims, 7 Drawing Sheets

ASSOCIATING A UNIQUE IDENTIFIER AND A HIERARCHY CODE WITH A RECORD

FIELD OF INVENTION

The invention generally relates to the field of data security. More specifically, the invention relates to recording and processing information associated with an electronic transmission deemed as violating an institution's security policy.

BACKGROUND

Web-based data transmission has become an increasingly popular form of communication. For example, electronic mail, better known as e-mail, has become a tool that society depends upon to communicate effectively and efficiently. In fact, it is now widely accepted that many businesses, including financial institutions, may prefer e-mail to traditional postal mail ("snail" mail) method of delivering documents to customers or potential customers partly because of the savings, because it is cheaper to send e-mail versus snail mail, and partly because of the speed, because it is faster than waiting for the mail system to sort and deliver the mail. However, web-transmission and email systems are not without their drawbacks.

Unfortunately, unauthorized individuals may attempt to intercept or otherwise gain access to sensitive information contained within web-transmissions and emails. For example, while security-enhancing technology such as encryption may help to provide increased security during transmission of emails and other data, non-encrypted transmissions still exist and such transmissions may still be extremely vulnerable. Therefore, an institution may have policies which set forth procedures on how sensitive information may be transmitted electronically. An electronic transmission may include a web-transmission, and may further include sending an e-mail, sending a file, submitting information on a website, transferring information via an instant message chat service, and the like. In one example, the policy may allow sensitive information to be transmitted if the transmission is secure (e.g., encrypted). In another example, the policy may allow certain pre-defined individuals or accounts to transmit sensitive information.

Sensitive information may be any information classified by an institution to be non-public. For example, in a banking context, non-public information may include customer names, customer addresses, customer phone numbers, social security numbers, customer account numbers, customer account personal identification numbers (PIN) and the like. Sensitive information may be any information deemed as such by the institution.

An institution or a third party may monitor emails or web transmissions by the institution's associates to determine compliance with an institution's policy on transmitting sensitive information electronically. For example, product are commercially available which may monitor and track all outgoing electronic transmission to determine compliance with an institution's policy, and upon a violation, may record the details of the violation for reporting to the institution. Upon determining that a violation or non-compliance of institution's policy has occurred, the institution may capture information related to that violation. For example, the third-party application may record information related to the violating transmission in a database. In another example, the institution may record information related in a table or file. Such information may include the actual violating e-mail or web-transmission, or alternatively, a snapshot of the violating transmission, sender information which may include a sender email address or the internet protocol (IP) address of the device that sent the violating transmission, and the like. One of ordinary skill in the art would appreciate these and other methods for determining compliance with or violation of an institution's policy on transmitting sensitive information electronically.

While there are known methods of determining compliance with an institutional policy, only arcane methods of tracking violators and the type of violation are available, such as logging the information by manually inputting the details of the violation. As such, gauging the effectiveness of policing senders who violate a policy may be difficult or costly. Furthermore, such a process of tracking violations might not be timely and by the time the data is processed, the data may be inaccurate. Additionally, determining if, for example, only certain individuals are prone to violations may be difficult. In another example, determining if certain groups of people within a department are prone to violations may also be difficult.

BRIEF SUMMARY

This summary is provided to introduce a selection of concepts in a simplified form that are further described in the Detailed Description. The summary is not intended to identify key features or essential features of the claimed subject matter, nor is it intended to limit the scope of the claimed subject matter.

An institution may monitor all outgoing electronic transmission to determine compliance with an institution's policy. Upon detecting a violation, the institution may record the details of the violation and may identify the sender of the violating transmission by associating the sender's unique identifier and group identifier with the violation record. The unique identifier and group identifier may be used as a sort filter to improve the accuracy of reporting metrics and statistics related to the violations by a particular individual or group of individuals.

In one aspect, after emails or web-based transmissions are identified as violating an institution's policy, a server may receive information related to the violating action and may create a record in a database to include information related to the violation. A database may store the record. The server may process the record. The processed record may include a unique identifier indicating the sender and a hierarchy code indicating where the sender's position is within the institution's hierarchy. The processed record may pass to a remediation agent for remediation and the processed record updated based on remediation action taken.

In another aspect, after emails or web-based transmissions are identified as violating an institution's policy, a server may receive information related to the violating action and may create a record in a database to include information related to the violation. A database may store the record. The server may process the record. The processed record may include a unique identifier indicating the sender and a hierarchy code indicating where the sender's position is within the institution's hierarchy. The processed record pass to a reporting module which may generate a report based on the unique identifier and/or a hierarchy code.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized and structural and functional modifications may be made without departing from the scope of the present claimed subject matter.

Figure 1:
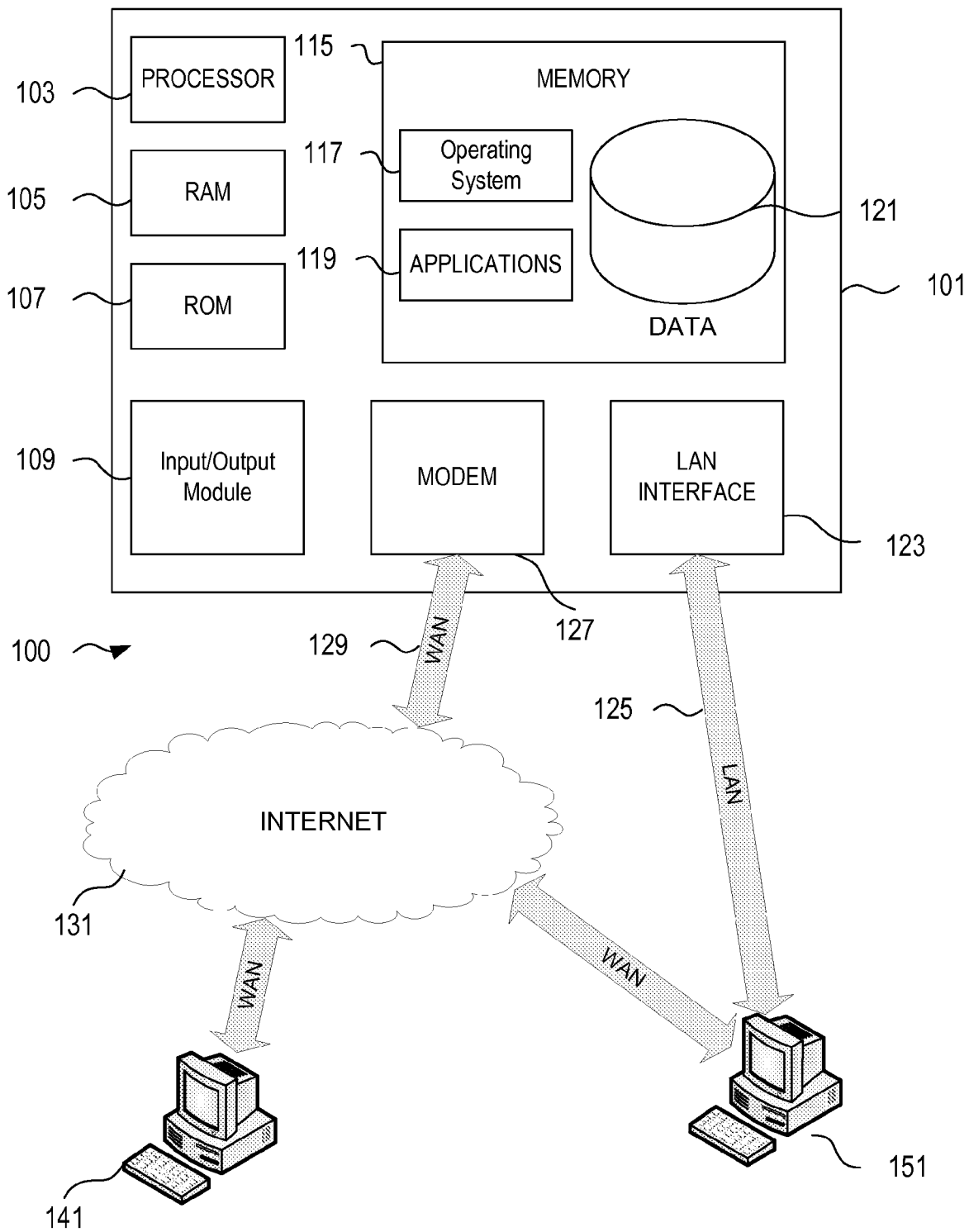
FIG. 1 illustrates a block diagram of a computing environment that may be used according to one or more aspects of the invention.

FIG. 1 illustrates a block diagram of a computing environment 100 including a generic computing device 101 (e.g., a computer server) that may be used according to an illustrative embodiment of the invention. The computer 101 may have a processor 103 for controlling overall operation of the server and its associated components, including RAM 105, ROM 107, input/output (I/O) module 109, and memory 115.

I/O 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of account information and account holder information for the entire business, allowing interoperability between different elements of the business residing at different physical locations.

The computer 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the computer 101 according to an illustrative embodiment of the invention may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and the like that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
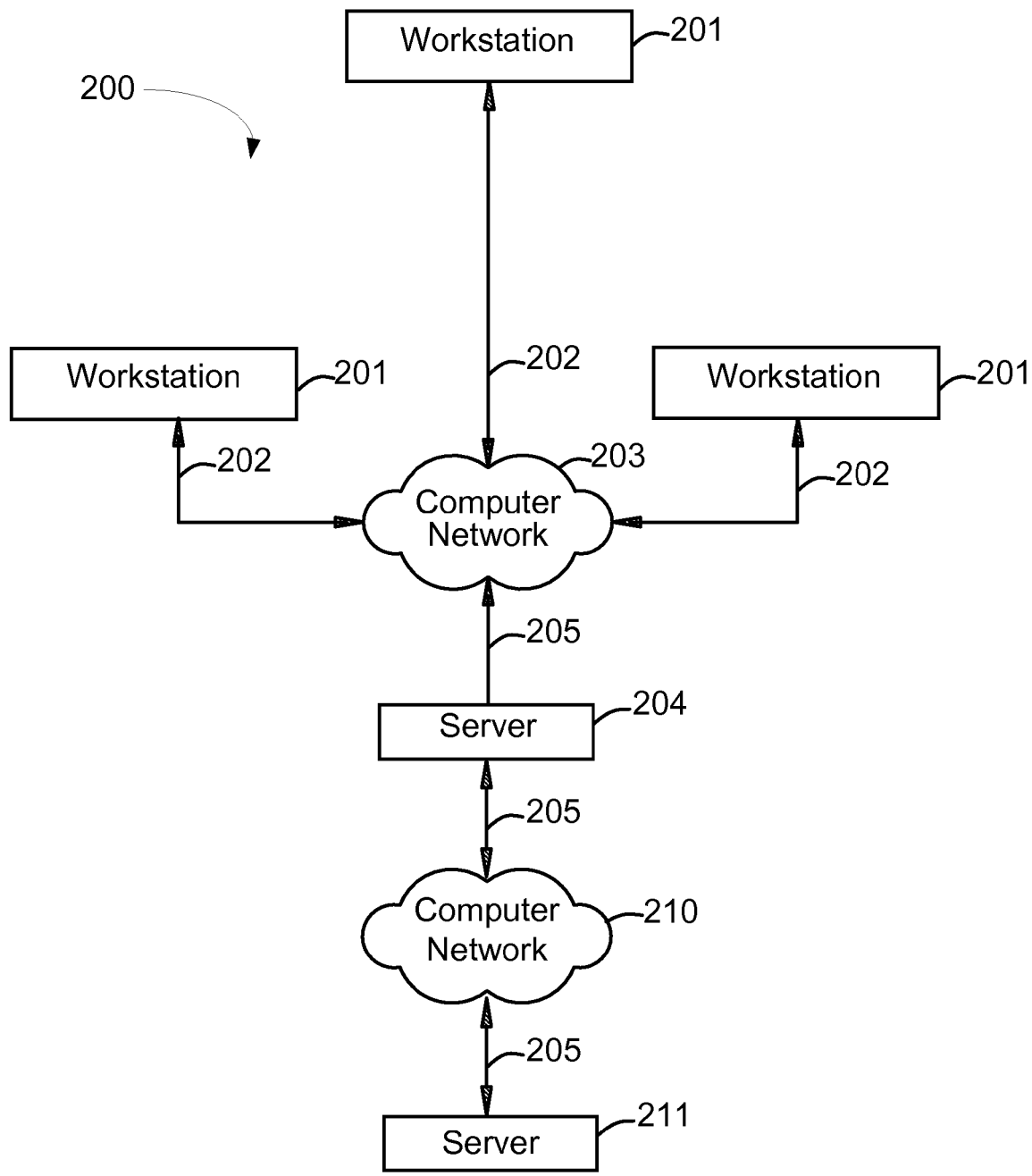
FIG. 2 illustrates a system for implementing methods according to one or more aspects of the invention.

Referring to FIG. 2, an illustrative system 200 for implementing methods according to the present invention is shown. As illustrated, system 200 may include one or more workstations 201. Workstations 201 may be local or remote, and are connected by one or communications links 202 to computer network 203 that is linked via communications links 205 to a server 204. In system 200, server 204 may be any suitable server, processor, computer, or data processing device, or combination of the same. Server 204 may be used to process the instructions received from, and the transactions entered into by, one or more participants.

Computer network 203 and 210 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201, and servers 204 and 211, such as network links, dial-up links, wireless links, hard-wired links, and others.

As understood by those skilled in the art, the steps that follow in the figures may be implemented by one or more of the components in FIGS. 1 and 2 and/or other components, including other computing devices.

The technology, such as the devices and networks described in FIGS. 1 and 2 may allow an institution to track the effectiveness of the preventative measures and the level of compliance by individuals or groups of individuals within the institution.

Figure 3:
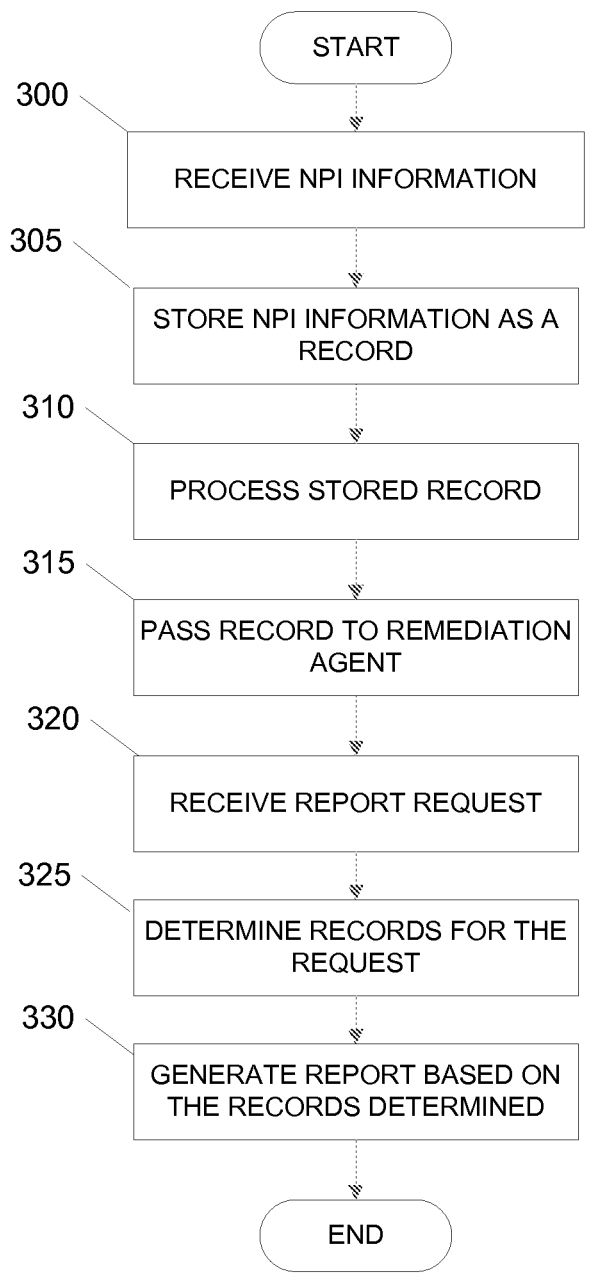
FIG. 3 illustrates a method of handling transmissions of data identified as violating a policy according to one or more aspects of the invention.

FIG. 3 illustrates a method of handling transmissions of data identified as violating a policy. At block 300, a server or computer (e.g., server 101 of FIG. 1 or server 204 of FIG. 2) may receive information related to the transmission of non-public information designated as a non-public incident (NPI). At block 305, the server may create and store a record based on the information received. The record may include any information relating to the policy violation. The record may further include a plurality of fields and a plurality of different types of information. In one configuration, the record may be a collection of fields where each field includes information related to the identification or transmission of the non-public information. For example, if the violating transmission was an email, the server may copy and store the entire email as a field within the record. Also, the server may include the sender's email address as another field within the record. In addition to the email address, the record may include an IP address or account log-in information used by the sender to log into the machine that sent the violating information. IP address and account log-in information may also be used as identifying information where the transmission might not be an email but, instead, a web-based submission or transfer. The server may also parse and include the non-public incident triggering the capture of the transmission in a separate field as part of the record. Additional information such as the recipient email address or IP address, the date and time of transmission, and the like may be included in the record. One record may be created for each NPI. As such, an associate that violates the institutional policy multiple times may have a record created for each violation.

In another configuration, the record may be a file containing information related to the transmission of data identified as violating a policy. For example, the file may contain information such as sender identification information (e.g., email address or IP address), data triggering the creation of the record (e.g., social security number), and other information related to the transmission of data.

At block 310, the server may process the stored record. For example, creation of the record may trigger processing of the record. Processing may include the addition of new fields or additional information to existing fields. For example, processing the record may include determining a unique identification number (UID) to be associated with the record and adding the UID information to be part of the record. After the record is processed to include a unique identification number and a corresponding group identification number, at block 315, the server may pass the record to a remediation agent for handling. Alternatively, the server may process the record before the record is stored in the database.

At block 320, the server may receive a request for creation of a report. At block 325, the server may determine which records may be needed to create the requested report. The server may also verify that the stored records are the most updated records available. At block 330, the server may create the requested report may based on one or more records. In another configuration (not shown), the server may send information to a reporting module which may receive one or more requests for reporting. After the server verifies that the records are updated, the server may send the information that the reporting module may use to create a report to satisfy the request.

In one aspect, the remediation agent may update the record based on actions that the agent has taken or based on new information available to the agent. For example, a remediation agent may update the record to include a response by the sender who violated the institutional policy. In another example, the record may be updated to include the agent's comments based on communication with the sender. Additionally, the agent may update the record to show that the incident may have been completely resolved. For example, the associate may change a field in the record from "unresolved" to "resolved". In another example, the associate may update the record to "flagged by error" if the transmission might not have transmitted non-public information but may have triggered the server to create a record. Alternatively, the agent may delete a resolved or erroneous record.

In one aspect, the server may verify identified records by comparing the record with information stored at a third party server or repository. If there is a discrepancy, the server may process the record to reflect the information stored at a third party server or repository.

Figure 4:
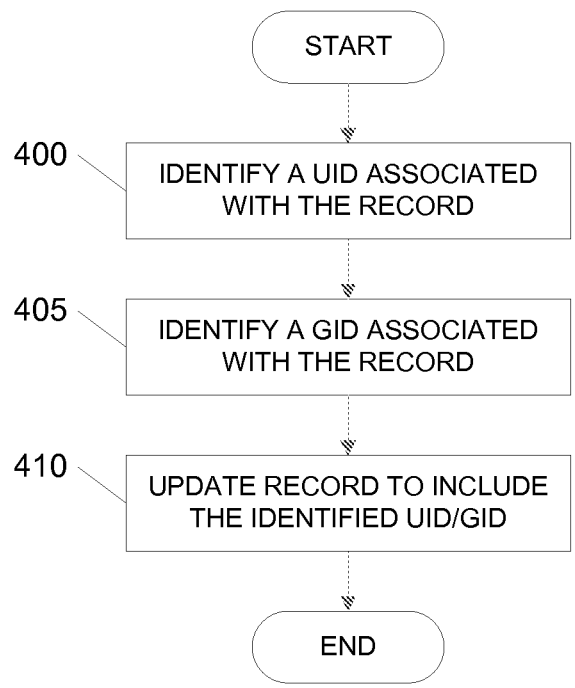
FIG. 4 illustrates a method of processing a record according to one or more aspects of the invention.

FIG. 4 illustrates a method of processing a record. Processing a record may include associating an individual and a group that the individual may be a part of with the record. The server may begin processing a record after the server has received and/or stored the record. At block 400, the server may identify a UID associated with the record. Each individual within an institution may previously be assigned a unique identification number (UID) to identify that individual. The UID may be a random or selected alphanumeric string. For example, an UID for Employee A may be EMPLYA123 or 123EMPLYA, or anything else. A database may store one or more UIDs and may further store corresponding information related to the individual corresponding to the UID. The UID database may store the individual's working title, position, email address, the IP address of the workstation assigned to the individual, and the like. In one configuration, the server may store the UID database on a server (e.g., server 101 or server 204). In another configuration, the UID database may be stored at a location different than where the record is stored.

To determine which UID to associate with a created record, the server may select information already included in the record (such as an email address) and search for that information in the database. If the selected information (e.g., email address) fails to match information in the database, the server may select different information (e.g., IP address) and a new search of the same or different database may take place to determine the corresponding UID number. After the search determines a valid match, computer 100 may query the database to determine which UID is associated with the matched information. If a UID cannot be associated with the record by the server, the server may send a message to a remediation agent requesting that the remediation agent provide a UID.

In one configuration, if one piece of information failed to match information in the database (e.g., email address of the sender), but a different piece of information matched the database (e.g., IP address of the transmitting device), server may update the database such that a subsequent search on the information that failed to match information in the database may instead result in identifying the UID (e.g., email address now matches). Alternatively, the server may select a default UID in instances where a match cannot be found between a piece of information in the record and information stored at the UID database and a remediation agent may update the UID after investigating the incident.

After determining a UID to be associated with the record, a group identification number (GID) may be identified at block 405. A GID may be an alphanumeric string and may determine to which group the individual associated with the UID belong. A GID may be a hierarchical code and may reflect a hierarchy of an institution (e.g., as defined by an organizational chart) and may also reflect where the individual associated with the corresponding UID may be positioned in the institutional hierarchy (e.g., where the individual is positioned on the organizational chart). A GID may differ from the UID in that an individual at an institution may be assigned a different GID after the individual changes positions within the institution (e.g., a promoted individual may have a different GID after the promotion) where the individual may retain the same UID, even after changing positions within the institution.

In one configuration, each digit of the GID may represent a different aspect of the position. For example, in one scheme, the lower the GID value, the higher the rank of the individual. A GID of 00001 may indicate that the person is the president or CEO of the institution. A GID of 99999 may indicate the person is a temporary associate. In an example of another scheme, the first 2 digits of the GID may indicate a group number and the last 3 digits of the GID may indicate the position of the individual within the group. So, for example, a GID of 05001 may indicate that the individual is in group "05" and holds the position corresponding to "001" which may, for example, indicate that the position is lowest ranking position in group "05". The highest ranking manager or president in group "05" may have a GID of 05999. It is appreciated that the alphanumeric characters of a GID may be defined by an institution. In one aspect, a GID may span an entire line of business (e.g., in a banking context, a mortgage department or a auto loans department). In another aspect, additional digits may be used to identify the various groups at the same level. For example, 00010A1 and 00010B1 may indicate that one individual is a member of the "A" group and the second individual is a member of the "B" group. One skilled in the art would appreciate that a plurality of specific grouping schemes are included in the spirit of the invention.

In addition, techniques for identifying a GID may be similar to techniques used to identify a UID. For example, the server may compare the IP address of the sending device (e.g., workstation) to a database which lists all known IP addresses of workstations and a corresponding GID assigned to that workstation. Alternatively, after identifying a UID, the server may identify the corresponding GID in a database or table using the identified UID.

At block 410, the server may update the record to include the identified UID and/or GID. After the record is processed to include the identified UID and GID, the server may pass the record to the remediation agent and/or receive a request for a report based on one or more records.

Figure 5:
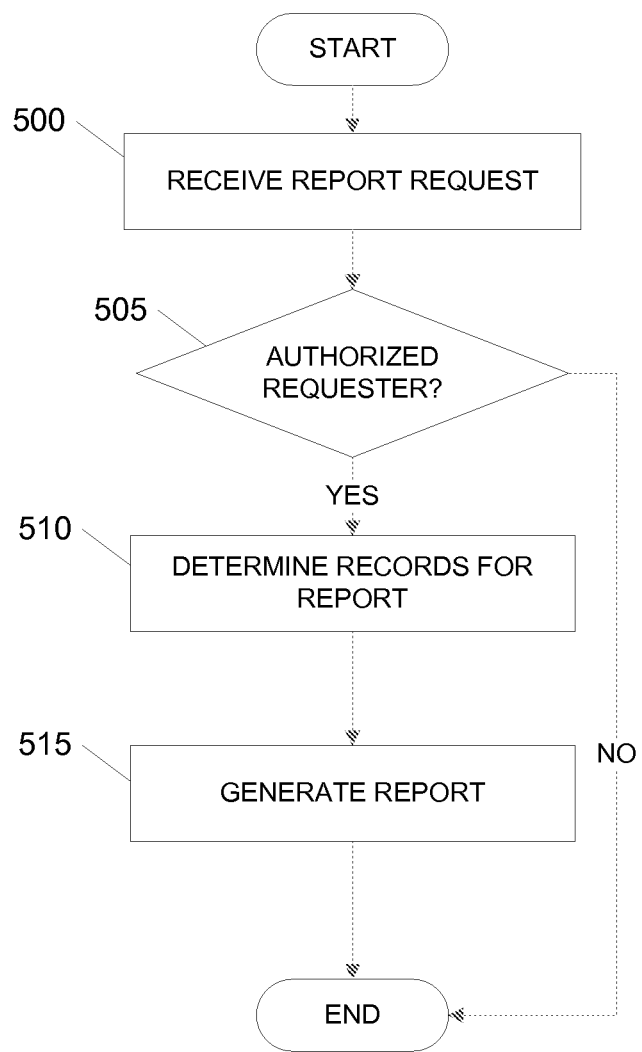
FIG. 5 illustrates a method of generating a report based on at least one UID and/or one GID according to one or more aspects of the invention.

FIG. 5 illustrates a method of generating a report based on at least one UID and/or one GID. At block 500, a server or reporting module may receive a report request including parameters such as names, groups, IDs (e.g., UID and/or GID) and the like. The request may be received via a user interface where the requesting user may select parameters from a drop down menu, selectable boxes, and the like. Additionally or alternatively, the user may type in text in a text box. At block 505, the server may determine if the requester is authorized to request the report. For example, the requester may be prompted to enter a password and based on the password, the requester may be allowed to request one or more requests for a report. In one aspect, different requesters may have different levels of authorization to request a report.

If the requester is not authorized to request a report, the process ends. If the requester is authorized to request a report, the server may determine which records may be needed to create the requested report at block 510. For example, if the request is for a group of individuals, the report may need all records for each of the individuals. In another example, a time frame or other pre-defined criteria may further filter records to be used in the creation or generation of the report. At step 510, the server may further determine which fields of the records may be needed to satisfy the request. The server may predetermine the fields or information that may be needed for a request. For example, some requested reports may have set formats with set information. A report based on a requested GID and timeframe may prompt the server to set a counter and count each record that meets the parameters of the report (e.g., requested GID and timeframe) and display the information in a pre-determined format (e.g., FIG. 7)

At block 515, the report may be generated based on the report request. In one aspect, the requester may be able to define the report by selecting display parameters such as report size (e.g., large, medium, or small), report type (e.g., chart, pie graph, text), and the like. In another aspect, the report may be generated in real-time or near real-time. The records which may be used to generate the report may be current and may reflect any updates at the time the report is requested.

Figure 6:
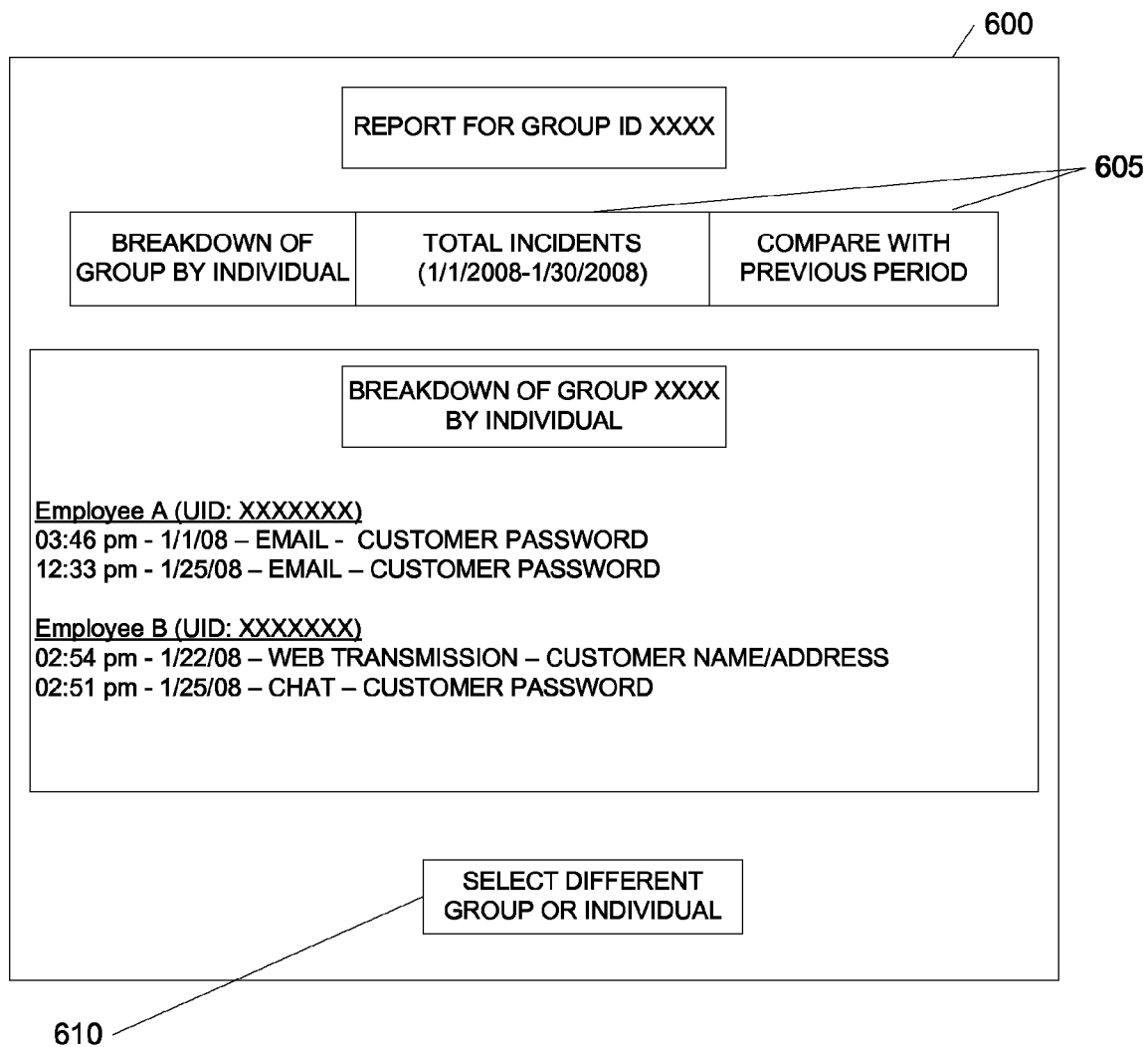
FIG. 6 illustrates one example of a report based on a requested group or GID according to one or more aspects of the invention.

FIG. 6 illustrates one example of a report 600 of a requested group. The report may list the different employees in a particular group and may list the details of the policy violation including time, date, method of transmission and the sensitive information that was transmitted. The report may also list the associate's name (e.g., Employee A) and the UID associated with the associate. The report may be part of an interface which may accept input for other reports. For example, the interface may include a link or a tab 605 which allows the requester to submit a request for another report by selecting the link or tab 605. In another example, the requester may input different parameters for a request by selecting link or tab 610. In one configuration, the group may be all individuals with a same GID.

Figure 7:
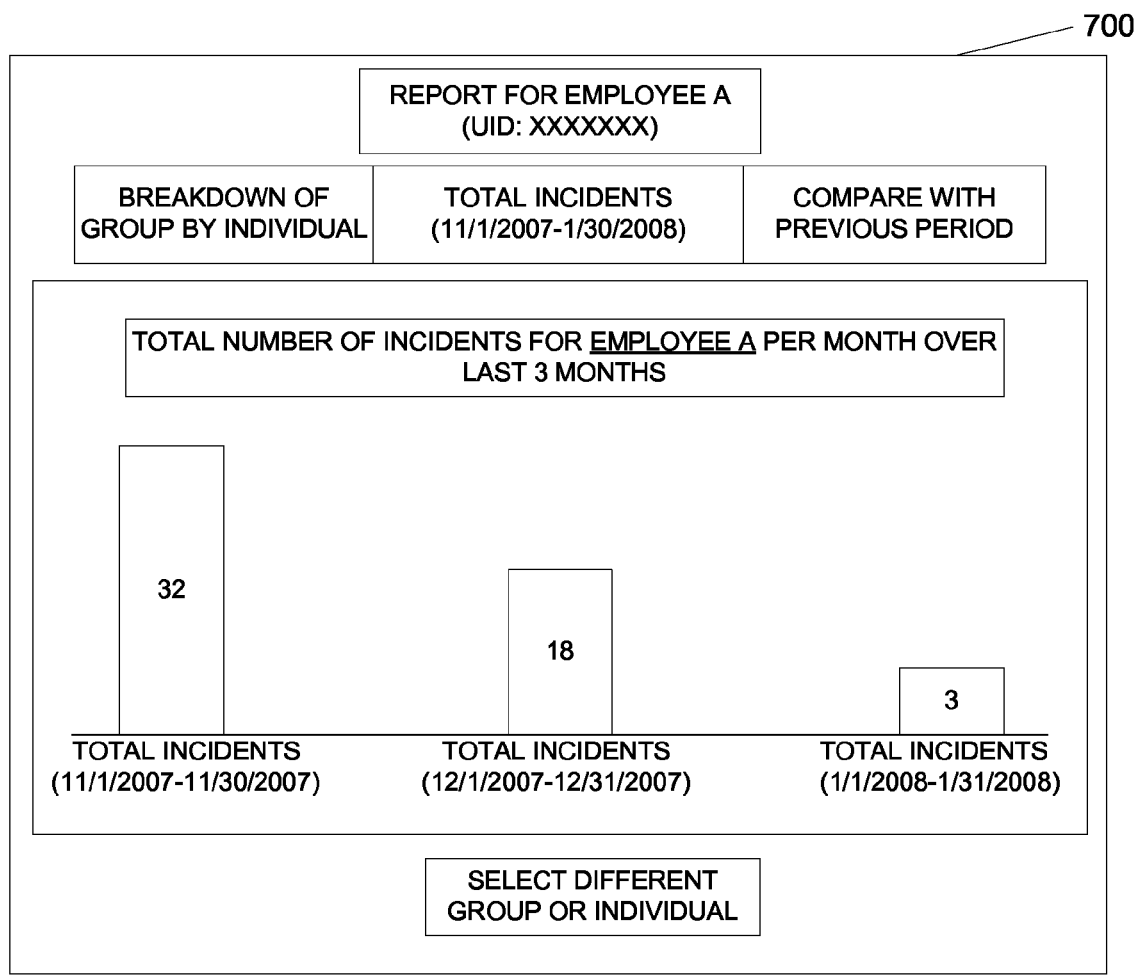
FIG. 7 illustrates an example of report based on the number of total incidents for a particular associate over a period of time according to one or more aspects of the invention.

FIG. 7 illustrates an example of report 700 of total incidents or total number of records for a particular associate over a period of time (e.g., 3 months). In this example of a report for a request of the number of incidents for a particular associate over the last three month, further broken down by months, the server may count the number of records for a particular individual or UID and display the report in a bar graph.

Aspects described herein are contemplated to be applicable for use by any type of institution that may desire to track the metrics of different groups or individuals and whether the individuals or groups have violated an institutional policy with respect to transmission of sensitive information electronically. While illustrative embodiments described herein embody various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or sub-combinations with the elements of the other embodiments. It will also be appreciated and understood that modification may be made without departing from the true spirit and scope of the present intention. The description is thus to be regarded as illustrative instead of restrictive on the present intention.

We claim:
1. A method comprising:
   identifying a transmission as violating a policy, wherein violating the policy is determined by identifying non-public information included in the transmission;
   creating a record based on the transmission;

processing the record to include a unique identifier number assigned to a user which corresponds to a sender of the transmission and a group identifier corresponding to the sender of the transmission;

in response to a request, generating a report based on at least one of the unique identifier number and the group identifier, wherein the group identifier is a non-unique code assigned to the sender based on a position of the sender within an institution; and allowing certain senders with pre-defined unique identifier numbers and group identifier codes to transmit non-public information based on a position of each of the certain senders position within the institution, and wherein processing the record to include the unique identifier number and the group identifier further includes:
selecting information from the record;
comparing the information selected from the record to determine if the selected information matches information in a database; and
in response to determining that the selected information matches the information in the database, selecting the unique identifier number which correlates to the information in the database,
wherein the selected unique identifier number corresponds to a replacement of a prior unique identifier number that did not match the information in the database.

2. The method of claim 1, further comprising:
transmitting the processed record to a remediation agent; and
in response to receiving information from the remediation agent, updating the record.

3. The method of claim 1, wherein the unique identifier number corresponds to the sender.

4. The method of claim 1, wherein the report is generated in real time and wherein the report is based on one or more records which are updated in real time.

5. The method of claim 1, wherein the selected information is one of an IP address and an email address.

6. The method of claim 1, further comprising:
in response to selecting the unique identifier number which correlates to the information in the database, selecting a second group identifier which correlates to the unique identifier number.

7. The method of claim 1, wherein the record comprises account log-in information used by the sender of the transmission, a time of the transmission, and an IP address of a recipient identified in the transmission.

8. The method of claim 1, wherein the report includes a plurality of unique identifiers numbers associated with a corresponding plurality of unique senders, and wherein the plurality of unique senders includes the sender, and wherein the request includes a request for the report over a pre-defined time frame based on the group identifier, and wherein the plurality of unique senders are members of a group within the institution, and wherein the group is associated with the group identifier, and wherein the report identifies a method of transmission associated with the transmission that violates the policy, and wherein the report identifies the non-public information that was included in the transmission.

9. An apparatus comprising:
a processor; and
a memory for storing computer readable instructions that, when executed by the processor, causes the apparatus to:
identify a transmission as violating a policy, wherein violating the policy is determined by identifying non-public information included in the transmission;
create a record based on the transmission;
process the record to include a unique identifier number assigned to a user which corresponds to a sender of the transmission and a group identifier corresponding to the sender of the transmission;
in response to a request, generate a report based on at least one of the unique identifier number and the group identifier, wherein the group identifier is a non-unique code assigned to the sender based on a position of the sender within an institution, and
allow certain senders with pre-defined unique identifier numbers and group identifier codes to transmit non-public information based on a position of each of the certain senders position within the institution, and
wherein processing the record to include the unique identifier number and the group identifier further includes:
select information from the record;
compare the information selected from the record to determine if the selected information matches information in a database; and
in response to determining that the selected information matches the information in the database, select the unique identifier number which correlates to the information in the database,
wherein the selected unique identifier number corresponds to a replacement of a prior unique identifier number that did not match the information in the database.

10. The apparatus of claim 9, wherein the memory stores computer readable instructions that, when executed by the processor, further causes the apparatus to:
transmit the processed record to a remediation agent; and
in response to receiving information from the remediation agent, update the record.

11. The apparatus of claim 9, wherein the unique identifier number corresponds to the sender.

12. The apparatus of claim 9, wherein the report is generated in real time and wherein the report is based on one or more records which are updated in real time.

13. The apparatus of claim 9, wherein the selected information is one of an IP address and an email address.

14. The apparatus of claim 9, wherein the memory stores computer readable instructions that, when executed by the processor, further causes the apparatus to:
in response to selecting the unique identifier number which correlates to the information in the database, select a second group identifier which correlates to the unique identifier number.

15. One or more non-transitory computer readable media configured to store instructions that when executed:
identify a transmission as violating a policy, wherein violating the policy is determined by identifying non-public information included in the transmission;
create a record based on the transmission;
process the record to include a unique identifier number assigned to a user which corresponds to a sender of the transmission and a group identifier corresponding to the sender of the transmission;
in response to a request, generate a report based on at least one of the unique identifier number and the group identifier, wherein the group identifier is a non-unique code assigned to the sender based on a position of the sender within an institution, and
allow certain senders with pre-defined unique identifier numbers and group identifier codes to transmit non-public information based on a position of each of the certain senders within the institution, and wherein processing the record to include the unique identifier number and the group identifier further includes:
select information from the record;
compare the information selected from the record to determine if the selected information matches information in a database; and
in response to determining that the selected information matches the information in the database, select the unique identifier number which correlates to the information in the database,
wherein the selected unique identifier number corresponds to a replacement of a prior unique identifier number that did not match the information in the database.

16. The one or more non-transitory computer readable media of claim 15, wherein the instructions when executed:
transmit the processed record to a remediation agent; and
in response to receiving information from the remediation agent, update the record.

17. The one or more non-transitory computer readable media of claim 15, wherein the unique identifier number corresponds to the sender.

18. The one or more non-transitory computer readable media of claim 15, wherein the report is generated in real time and wherein the report is based on one or more records which are updated in real time.

19. The one or more non-transitory computer readable media of claim 15, wherein the selected information is one of an IP address and an email address.

20. The one or more non-transitory computer readable media of claim 15, wherein the instructions, when executed:
in response to selecting the unique identifier number which correlates to the information in the database, select a second group identifier which correlates to the unique identifier number.

* * * * *